Figure 1:
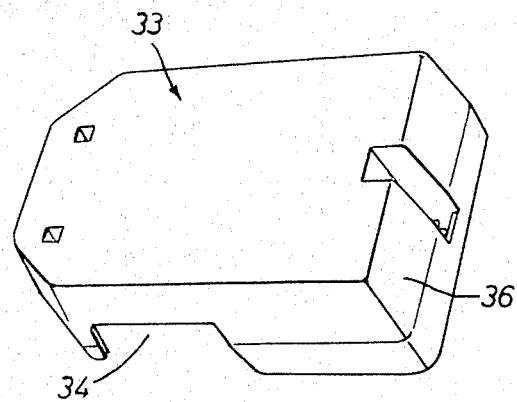

United States Patent [19]
Pedersen et al.

[11] 3,782,580
[45] Jan. 1, 1974

[54] ELECTRICAL CONNECTING ARRANGEMENT FOR AN ENCASED REFRIGERATING MACHINE

[75] Inventors: Hans Christian Pedersen; Erik Nielsen, both of Nordborg, Denmark

[73] Assignee: Danfoss A/S, Nordborg, Denmark

[22] Filed: Nov. 12, 1971

[21] Appl. No.: 198,326

[30] Foreign Application Priority Data
Nov. 10, 1970 Germany............... P 20 55 183.1

[52] U.S. Cl.............. 220/4 B, 220/3.94, 220/55 G, 220/96
[51] Int. Cl........................ B65d 7/24, B65d 45/06
[58] Field of Search.............. 220/4 R, 4 B, 4 D, 220/96, 55 R, 55 G, 55 BD, 95, 3.92, 3.94

[56] References Cited
UNITED STATES PATENTS

| | | | |
|---|---|---|---|
| 3,124,266 | 3/1964 | Morgan | 220/96 |
| 1,665,238 | 1/1928 | Turan | 220/4 D |
| 3,537,607 | 1/1970 | Loeffler | 220/4 R |

*Primary Examiner*—George E. Lowrance
*Attorney*—Wayne B. Easton

[57] ABSTRACT

The invention relates to an electrical junction box having a base, a frame and a cover as the three basic parts thereof. A U-shaped wire stirrup engages and cooperates with camming surfaces on the frame and cover in a manner so as to permit the easy and convenient locking together of the three basic members of the junction box.

2 Claims, 5 Drawing Figures

ELECTRICAL CONNECTING ARRANGEMENT FOR AN ENCASED REFRIGERATING MACHINE

The invention relates to an electrical connecting arrangement for an encased refrigerating machine, which arrangement comprises a plug element which is mounted on guide pins extending through and insulated against the casing wall and which preferably carries terminals at that of its ends remote from the guide pins, an insulating part provided with terminals, and a cover which covers the electrical parts and is detachably connected to the casing by way of a holder.

It is often required not to connect the supply leads of the refrigerating machine directly to the plug element, but also to provide an insulating part through which the connecting leads are attached. The reason for this may be that wires may branch from the supply leads to other equipment, e.g., illumination means for the cold box, or that other functional components, e.g., the starting relay for the motor of the refrigerating machine and an excess temperature protective cut-off are fitted to the plug element, and these other parts impose a limit upon the possible forms that the plug element may take. The entire electrical arrangement must be closed off by means of a cover which affords protection against manual contact and is therefore secured to the casing so firmly that it is not loosened by the vibrations to which the casing is subjected.

The cover is usually secured by means of at least one screw to a holder welded on to the casing. When the cover is being fitted, this screw must be introduced into its associated tapped portion and can easily get lost. Since the casing is normally incorporated in a cold box, the screw is often difficult of access especially as, during assembly and dismantling, the screw-driver has to be turned a large number of times and considerable force has to be used in tightening the screw.

The insulating part has previously been secured to the cover. This enabled the outer supply leads and the connecting leads to the plug element to be fitted to the insulating part independently of the already fitted refrigerating machine. Further steps in assembly have of course caused difficulties since the cover as had to be fitted in the immediate vicinity of the plug elements, the connecting leads have had to be secured to the terminals of the plug element and finally it has been necessary to mount the cover on the holder on the cap in the manner described without damaging the connecting leads. This work has often been further complicated by the fact that the individual elements on the already fitted casing were not readily accessible.

The object of the invention is to provide an electrical connecting arrangement of the initially described kind in which the electrical junctions and connexions can be established more easily and the fitting of the cover is facilitated.

According to the invention, this object is achieved by the insulating part being detachably secured to the holder and in turn incorporating a fixing device for the cover.

By this step it is possible for all the connecting leads to be fitted to the insulating part independently of the casing. The insulating part prepared in this manner can be mounted on the casing. The electrical connexions to the plug element can be established without the cover getting in the way. The fitting of the cover is generally simplified since its fixing device which is fitted to the insulating part may be at a greater distance from the casing than the normal holder previously used, and the fixing device is therefore more readily accessible. Casings with a holder for the cover of the kind previously used can be employed with the new connecting arrangement, since the cover is secured to the insulating part. Thus, a type of casing for the normal and for the new connecting arrangement can be used according to choice.

In a preferred construction, the insulating part takes the form of a frame surrounding the plug element, which frame carries the connecting terminals at that of its transverse faces remote from the casing. This transverse face is particularly easily accessible. Since this face is available for occupation over the entire peripheral extent of the frame, there is sufficient space for fitting a large variety of terminals. The cover itself can be small since the frame constitutes a considerable portion of the insulating covering surrounding the plug element.

In particular, the terminals on the insulating part may be disposed at substantially the same level as the terminals on the plug element. The electrical connexions that have to be established between the said elements at the place where the installation is located can be made in a particularly simple manner.

Furthermore, an adjustable clip for the outgoing leads can be provided on the transverse face of the insulating part. Not only is there sufficient space for this when for example the insulating part takes the form of a frame, but in addition a clamping screw for the adjustable clip is readily accessible on the transverse face, and long guides and screw-threaded portions for the adjustable clip can be provided, so that thick or thin cables, whichever are required, can be firmly clamped in position.

In a preferred construction the frame may be provided on the outside with a U-shaped wire stirrup which by inwardly directed hooks at the free ends of its limbs extends through slots in the frame and engages locking faces on the holder, the limbs of the stirrup being urged against stops on the outside of the frame by means of a clamping device applied near the central web of the stirrup. The resilient stirrup held down by the clamping device is supported on the locking faces and presses the frame against the casing.

The outside of the frame may incorporate inclined surfaces which, when the stirrup is twisted, cause it to splay out to such an extent that the hooks move sideways off the locking surfaces. Thus, by simply twisting the resilient stirrup, the frame can be released from or brought into engagement with the holder.

The inclined surfaces may be such that the hooks still remain in the slots when in the splayed-out psoition, a latching recess which holds the stirrup in the splayed-out position being provided at the end of each inclined surface. This ensures that the frame can be prepared in a convenient manner for fitting on the holder, it not being possible for the stirrup to get lost.

Particular advantage accrues if the cover comprises a surface which clamps the resilient stirrup. If the cover forms part of the clamping device, the cost of the system is further reduced and after the cover has been fitted, the insulating part is secured in a safer manner to the casing.

The clamping surface can engage the middle of the central web and each of the limbs may bear against further stops on the outside of the frame near the central web. The further stops limit the clamping force of the limbs of the spring, whilst further resilient deformation of the central web does not substantially influence the conditions defined in this manner.

It is also advantageous if the cover is hinged to the frame at that side opposite the clamping point, and near the clamping surface resiliently engages behind a locking face of the frame by means of a latch. If, in this arrangement, the cover is swung about the hinge into its closed position so that it is latched in, the resilient stirrup is tensioned and at the same time the clamping position is held.

If, in this construction, the clamping surface is inclined towards the interior of the cover in the direction of the open side of the cover, the central web of the spring will not only be deformed in the direction of the casing, but at the same time it will be urged outwardly so that it applies a resilient load to the latch of the cover and thus reinforces the spring action of the latch.

Also, the base of the cover may contain an opening which leads to the space between the inside wall of the cover near the latch and an inclined surface preceding the locking face on the frame. If a tool is inserted in this opening the latch is pressed outwards, the cover is released and the clamping device is disengaged, so that all the parts can be separated from each other without the need for releasing a screwed connexion. A suitable tool is for example a screw-driver the flat end of which, after having been inserted in the opening, is turned slightly about the axis of the screw-driver. Since the tool is introduced in a direction that is radial to the casing, this method of releasing the connecting arrangement can also be used when the conditions in which the casing is fitted in the cold box are unfavourable.

Figure 2:
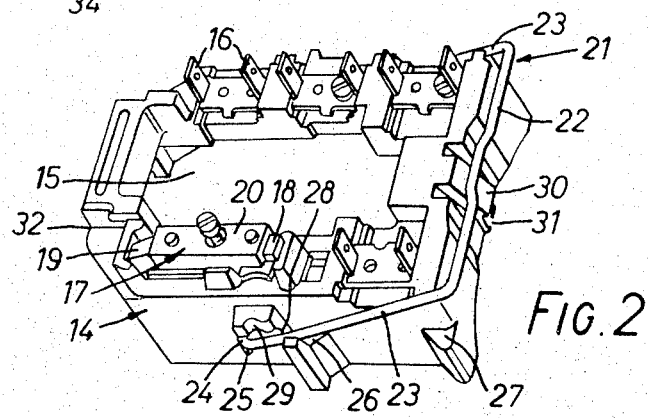
Figure 3:
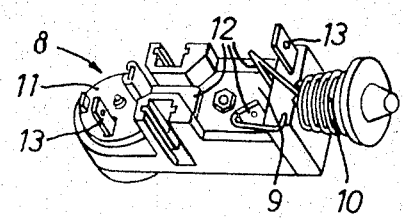
Figure 4:
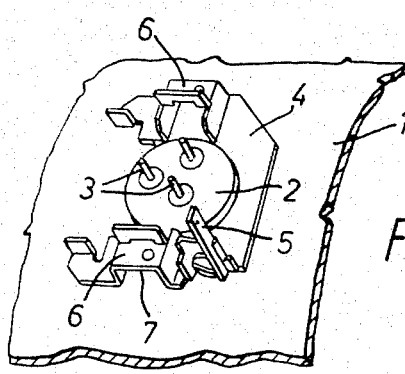
Figure 5:
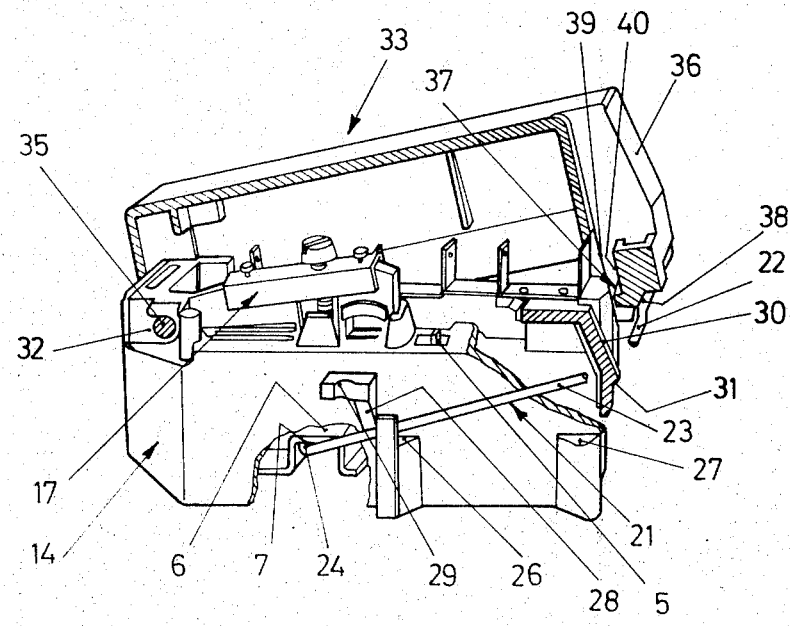

The invention will now be described in more detail by reference to an embodiment illustrated in the drawing, in which:

FIG. 1 shows a cover,
FIG. 2 shows an insulating part,
FIG. 3 shows a plug element,
FIG. 4 shows a casing with the guide pins and holder, all the abovementioned figures being perspective illustrations of the elements, that are to be combined, in the separated condition, and
FIG. 5 shows the insulating part and the cover, partly in section, during the assembly stage.

A holder 4 made of bent sheet-metal is welded to a casing 1 near a lead-through 2 comprising three guide pins 3. This holder carries a terminal 5 for an earth lead. The parts of the holder of interest here are two bridge-like raised portions 6, on the undersides of which are formed locking surfaces 7.

A plug element 8 is mounted on the guide pins 3. This element consists of a carrier 9, a starting relay 10 for the asynchronous motor of the refrigerating machine, and an excess temperature protective cut-out 11. On that side not visible in the drawing are three bushes which are pushed on to the guide pins 3, while on the side that can be seen there are provided three connexions 12. Also provided are two terminals 13 to which the leads from the mains supply must be connected.

An insulating part takes the form of a frame 14, the interior 15 of which is adapted to accommodate the plug element 8. On the transverse surface of the frame, shown facing upwards in FIG. 2, there are located numerous connectors 16 and an adjustable clip 17. The latter consists of two elements 18 and 19 which are held in the frame by means of parallel guides, are hinged on a common bridge element 20, and can be pressed by means of a screw against the transverse face of the frame. Incoming supply leads and connecting leads running to the plug element 8 can be fitted to the connectors 16.

The frame 14 carries a U-shaped spring-wire stirrup 21 having a central web 22 and two limbs 23 having at their free ends inwardly directed hooks 24 which extend through slots 25 in the frame. Two stops 26 and 27 on the outside of the frame are associated, one each, with a limb 23 of the stirrup. Also, an inclined surface 28 containing a latching recess 29 is provided, one on each side, and when the stirrup 21 is swung up these inclined surfaces splay out the hooks 24 on the stirrup to an extent such that they move out of the area constituted by the inside cross-section of the frame, but still remain in the slots 25, this splayed-out position being maintained by the latching surfaces 28.

Near the middle of the central web 22, the frame also has an inclined surface 30, at the ends of which there is provided a locking face 31 running parallel with the end face of the frame. At the opposite side of the frame there are provided two rounded grooves 32 which serve as a hinge point for the cover.

The cover 33 carries no electrical connecting parts. It contains a recess 34 near the adjustable clip 17 for the purpose of the introduction of supply leads. The cover carries pins 35 which can be inserted in the hinge grooves 32, and on its opposite resiliently deformable side wall 36 it has a latch 37 which is adapted to cooperate with the locking surface 31, and on the exterior it has a clamping surface 38 which extends obliquely inwards towards the open end of the cover 33. This area also contains an opening 39 in the base of the cover, which opening is bounded on one side by a surface 40.

The assembly procedure is as follows. The plug element 8 is fitted on the guide pins 3. Independently of this, the outer supply leads are connected to the terminals 16 on the frame 14. The associated cables are secured on the frame 15 by means of the adjustable clip 17. Connecting leads running to the plug element 8 are either already secured to the terminals 16 or are now connected to them.

The spring stirrup 21 is then swung into the splayed-out position in which it is locked by the latching recesses 29. The frame 14 is then pushed over the plug element, and the stirrup 21 is swung back into the position illustrated in FIG. 5. As this happens, the hooks 24 move inwards below the locking surfaces 7 on the holder 4. The free ends of the connecting leads can now be comfortably fitted on the terminals 13 of the plug element 8, which terminals are located at the same level as the terminals 16. The pins 35 of the cover are then pushed into the link grooves 32, and the cover is simply pressed towards the casing until the latch 35 snaps behind the locking face 31.

At the same time, the frame 14, previously only loosely attached to the holder 4, is thus firmly locked in position since, by way of the clamping face 38, the cover 33 urges the spring stirrup downwards to an extent such that the limbs of the stirrup bear on the stops 26 and 27. The spring clamping force between the stop 26 and the locking face 7 provides a contact force sufficient to hold the frame 14 against the casing. The stop 27 keeps the clamping force within a certain range. Because of the slope on the surface 38, the central web 22 is pressed slightly outwards during the clamping operation, so that the spring action of the stirrup reinforces the spring force of the resilient side wall 36 and holds the elements of the latching connexion firmly together.

For the purpose of taking the system apart all that is necessary is to introduce a screw-driver into the opening 39 and to turn it slightly about its axis. This causes the surfaces 30 and 40 to be forced apart and the latch 37 is released from the locking face 31. The spring force of the stirrup 21 then automatically lifts the cover 33. It can then be removed. Also, the frame 14 is still attached loosely to the holder 4. By swinging up and suitably splaying the spring stirrup 21, the frame can then be fully released from the holder.

The arrangement can be fitted in any plane. In particular, it can be fitted on a vertical casing wall. When the casing is installed in a cold box, it is only necessary to ensure that the zone in which the openings are located is accessible in the radial direction, since in all cases the transverse surface of the plug element and frame is then exposed for the purpose of making the connexions and the tool inserted for releasing the cover is likewise introduced in the radial direction, whereas no tool at all is required for securing the cover.

We claim:

1. An electrical junction box comprising a base, a frame, bracket means attached to said base having a pair of spaced and downwardly facing locking surfaces, said frame having stirrup holes adjacent said locking surfaces, said frame having stirrup holes adjacent said locking surfaces, a generally U-shaped stirrup having a pair of legs, laterally extending hooks attached to said legs and disposed in said holes, first camming means on said frame for biasing said legs to move said hooks into locking engagement with said locking surfaces, and second camming means on said frame for biasing said legs to move said hooks out of locking engagement with said locking surfaces, a cover, pivotal connecting means between said cover and said frame, engageable clamping surfaces on and between said cover and said frame, and an abutment surface on said cover engageable with said stirrup to move said stirrup into a locking position.

2. An electrical junction box according to claim 1 including stop surfaces on said frame engageable by said stirrup to limit the ultimate movement of said stirrup.

* * * * *